United States Patent
Kulkarni et al.

(10) Patent No.: US 11,109,283 B1
(45) Date of Patent: Aug. 31, 2021

(54) HANDOVER SUCCESS RATE PREDICTION AND MANAGEMENT USING MACHINE LEARNING FOR 5G NETWORKS

(71) Applicant: Accenture Global Solutions Limited, Dublin (IE)

(72) Inventors: Apeksha Jayateerth Kulkarni, Navi Mumbai (IN); Shaik Nayeem, Bengaluru (IN); Shailesh Shashi, Bangalore (IN); Ramesh Veera Venkata Durga Potta, Bangalore (IN); Vikas Manohar Sharma, Bengaluru (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 17/028,963

(22) Filed: Sep. 22, 2020

(51) Int. Cl.
*H04W 36/00* (2009.01)
*H04W 36/22* (2009.01)
*G06N 20/00* (2019.01)
*G06N 3/02* (2006.01)

(52) U.S. Cl.
CPC .......... *H04W 36/0055* (2013.01); *G06N 3/02* (2013.01); *G06N 20/00* (2019.01); *H04W 36/0083* (2013.01); *H04W 36/22* (2013.01)

(58) Field of Classification Search
CPC ......... H04W 36/0055; H04W 36/0083; H04W 36/22; G06N 20/00; G06N 3/02
See application file for complete search history.

(56) References Cited

U.S. PATENT DOCUMENTS

2015/0131537 A1* 5/2015 Chiang ................ H04L 5/0076
370/329
2020/0029230 A1 1/2020 Bellamkonda et al.

OTHER PUBLICATIONS

U. S. Hashmi et al., "Towards Real-Time User QoE Assessment via Machine Learning on LTE Network Data," 2019 IEEE 90th Vehicular Technology Conference (VTC2019-Fall), Honolulu, HI, USA, 2019, pp. 1-7, doi: 10.1109/VTCFall.2019.8891552. (Year: 2019).*
L. L. Vy et. al. "Big data and machine learning driven handover management and forecasting," 2017 IEEE Conference on Standards for Communications and Networking (CSCN), Helsinki, 2017, pp. 214-219 (Year: 2017).*

(Continued)

*Primary Examiner* — Yuwen Pan
*Assistant Examiner* — Umair Ahsan
(74) *Attorney, Agent, or Firm* — Norton Rose Fulbright US LLP

(57) ABSTRACT

Aspects of the present disclosure provide systems, methods, and computer-readable storage media that leverage artificial intelligence and machine learning to predict future handover success rates of cells of a wireless network and to determine updated network parameter values that may be used to improve the future handover success rates. Clustering algorithms may be applied to handover success rates associated with the cells to group the cells into different clusters. Machine learning (ML) models may be trained based on historical handover data associated with cells of the clusters to predict future handover success rates based on current handover success rates. The output of the ML models may be used to determine one or more updated network parameter values to be implemented by the wireless network to improve future handover success rates at one or more cells.

20 Claims, 4 Drawing Sheets

(56) References Cited

OTHER PUBLICATIONS

Vy, L. L. et al., "Big Data and Machine Learning Driven Handover Management and Forecasting," 2017 IEEE Conference on Standards for Communications and Networking (CSCN), Sep. 2017, 7 pages.

European Patent Office, Communication, Extended European Search Report issued for European Patent Application No. 20204348.5, dated Aug. 26, 2021, 10 pages.

* cited by examiner

HANDOVER SUCCESS RATE PREDICTION AND MANAGEMENT USING MACHINE LEARNING FOR 5G NETWORKS

TECHNICAL FIELD

The present invention relates generally to handover success rate prediction techniques, and more specifically to systems and methods for leveraging machine learning and artificial intelligence to automatically predict handover success rates for one or more cells of a wireless network.

BACKGROUND

Network technology advancements have resulted in rapid deployment and adoption of network services and functionality. For example, the services and functionality provided by voice communication networks (e.g., 4th Generation (4G) and 5G communication networks), content distribution networks, enterprise and cloud-services networks, and the like have become widespread and play a vital role in the way we work, communicate, and consume audio and video content. Two goals of 5G networks are to provide high bandwidth and high transmission rate service for different kinds of terminals in multiple scenarios, in order to support data-heavy services such as high definition multimedia streaming, online gaming, three-dimensional (3D) multimedia streaming, augmented reality, virtual reality, and the like. Due to such emerging services, mobile and wireless traffic volume has been predicted to increase a thousand-fold in the near future, such that the area throughput in some densely populated areas may reach tens of terabytes/second/square kilometer ($Tb/s/km^2$) and the data rate experienced by users may exceed 1 gigabyte/s (Gbps).

To meet the expected traffic demands, 5G networks may include many small cells, as compared to 4G or other wireless networks. The small cells, which may include microcells, femtocells, picocells, etc., have reduced coverage range and increased cell density, as compared to larger cells. However, increasing the number of cells in a wireless network may have drawbacks. For example, increasing the number of cells, especially cells with reduced coverage ranges, increases the number of handovers experienced by a user device, such as a mobile phone, as the user device travels between coverage areas of different cells (e.g., base stations).

Handover is typically one of the most important and complex key performance indicators (KPIs) for wireless networks, and may directly affect quality of service (QoS), quality of experience (QoE), and mobility performance. Additionally, because data rates of 5G networks may be significantly higher than 4G networks, sometimes approximately 1000 times higher, handover processing in 5G networks requires faster processing. In traditional mobility management schemes, handover parameters are set for each cell by a mobile operator who manually determines the handover parameters, often based on user data from mobile devices. For 5G networks that include many small cells, this process requires significant manpower, in addition to being inefficient and inaccurate. Incorrect handoff parameter settings can negatively affect user experiences and waste network resources due to handoff and radio link failures (RLFs). What is needed is improved techniques for determining handoff parameters for cells of wireless networks that scale with the increased number of small cells in 5G networks.

SUMMARY

The present application discloses systems, methods, and computer-readable storage media that leverage artificial intelligence and machine learning techniques to automate prediction (e.g., forecasting) of handover success rates for cells of a wireless network and selection of updated network parameter values (e.g., updated handover parameter values) to improve future handover success rates for the cells. Handover data that indicates handover success rates for multiple cells of a wireless network may be analyzed using artificial intelligence processes to identify clusters of cells that have similar handover behaviors. Historical handover data (including historical handover success rates) for cells of the clusters may be used to train machine learning models to predict future handover success rates for cells of the clusters based on current handover success rates and/or other handover data. The predicted future handover success rates may be used to identify updated handover parameter values for cells that may improve actual future handover success rates for the cells. The updated handover parameter values may be fed back the wireless network to configure the cells without requiring manual activity by a mobile operator.

To illustrate, a server or other computing device may receive handover data that indicates handover success rates and/or handover failure rates (and optionally additional handover-related information) for multiple cells of a wireless network. The server may receive the handover data from the cells (e.g., from the base stations) or from other devices or components of the wireless network that aggregate measurements of network activity for the cells. The server may provide the handover data to one or more machine learning (ML) models that are configured to group cells of the wireless network into clusters having similar handover behaviors based on the handover data. The one or more ML models may include or correspond to neural networks (NNs), support vector machines (SVMs), decision trees, random forests, regression models, Bayesian networks (BNs), dynamic Bayesian networks (DBNs), Gaussian processes, hidden Markov models (HMMs), and the like, that are configured to perform clustering. In some implementations, the one or more ML models may be configured to perform k-means clustering to group the cells into clusters based on the handover data.

After grouping the cells into clusters based at least in part on the handover success rates, the server may predict future handover success rates for a cell based on current handover data associated with the cell. To predict the future handover success rates, the server may implement artificial intelligence processes and deep learning techniques. For example, the server may provide the current handover data to one or more ML models that are trained to predict future handover success rates for a cell based on current handover data for the cell. In some implementations, the one or more ML models may include or correspond to one or more long short-term memory (LTSM) networks, one or more recurrent neural networks (RNNs), or a combination thereof. Alternatively, the one or more ML models may include or correspond to SVMs, decision trees, random forests, regression models, BNs, DBNs, Gaussian processes, HMMs, and the like. The one or more ML models may be trained based on historical handover data (including historical handover success rates) for cells of the same cluster to configure the one or more ML models to predict future handover success rates. The one or more ML models may be similarly trained for other clusters.

After predicting the future handover success rates, the server may determine one or more network updated parameter values based on the predicted future handover success rates. The updated network parameter values may be selected for implementation by respective cells of the wireless network to improve the future handover success rates for the cells. For example, the updated network parameter values may include reference signal received power (RSRP) thresholds, reference signal received quality (RSRQ) thresholds, hysteresis margins, time-to-trigger (TTT) thresholds, averaging window parameter values, other handover-related parameters, or a combination thereof. The server may provide the updated network parameter values to the wireless network for use in configuring (e.g., tuning) the respective cells.

The present disclosure describes techniques that provide improvements compared to other handover prediction and network parameter tuning (e.g., updating) techniques. For example, the present disclosure describes systems that predict future handover success rates automatically using deep machine learning. The predicted future handover success rates are used to select updated network parameter (e.g., updated handover parameter) values for cells of a wireless network, which may reduce handoff and RLF failures as compared to network parameter values determined by a mobile operator. Handover success rates (and/or handover failure rates) may be one of the most important key performance indicators (KPIs) for mobile networks, thus using handover success rates to determine updated network parameter values may reduce handoff and RLF failures more than using other handover metrics, such as handover attempts or traffic channel attempts. Reducing handoff and RLF failures may improve network quality and QoE of users. Additionally, by grouping cells into clusters and predicting handoff success rates at the cluster level, the systems of the present disclosure may predict future handoff success rates with reduced computational complexity than if future handoff success rates are predicted for each individual cell. Such reductions in computational complexity may enable handoff success rate prediction for wireless networks that include many small cells, such as 5G-compliant ultra-dense networks (UDNs). Additionally or alternatively, the ML-based handover success rate prediction and updated network parameter value selection techniques may be implemented in self-organizing networks (SONs) to provide automatic and faster cell management, in addition to shifting from being reactive to proactive in cell management, with minimum human activity, thereby reducing operational costs associated with the wireless network.

In a particular aspect, a method for predicting handover success rates and updating network parameter values using machine learning includes receiving, by one or more processors from one or more network entities of a wireless network, handover data associated with a plurality of cells of the wireless network. The handover data indicates handover success rates associated with the plurality of cells. The method also includes providing, by the one or more processors, the handover data to a first set of machine learning (ML) models to group the plurality of cells into multiple clusters of cells. The first set of ML models are configured to cluster cells based at least in part on the handover success rates associated with the cells. The method includes, for each of one or more clusters of the multiple clusters, providing, by the one or more processors, a portion of the handover data associated with cells of the cluster to a second set of ML models to predict future handover success rates for the cells of the cluster, and determining, by the one or more processors, one or more network updated parameter values for the cells of the cluster based on the predicted future handover success rates. The second set of ML models are configured to predict future handover success rates based on handover data associated with the cells of the cluster. The method further includes initiating transmission, by the one or more processors, of the one or more network updated parameter values to one or more network entities of the wireless network.

In another particular aspect, a non-transitory computer-readable storage medium stores instructions that, when executed by one or more processors, cause the one or more processors to perform operations for predicting handover success rates and updating network parameters using machine learning. The operations include receiving, from one or more network entities of a wireless network, handover data associated with a plurality of cells of the wireless network. The handover data indicates handover success rates associated with the plurality of cells. The operations also include providing the handover data to a first set of machine learning (ML) models to group the plurality of cells into multiple clusters of cells. The first set of ML models are configured to cluster cells based at least in part on the handover success rates associated with the cells. The operations include, for each of one or more clusters of the multiple clusters: providing a portion of the handover data associated with cells of the cluster to a second set of ML models to predict future handover success rates for the cells of the cluster, and determining one or more updated network parameter values for the cells of the cluster based on the predicted future handover success rates. The second set of ML models are configured to predict future handover success rates based on handover data associated with the cells of the cluster. The operations further include initiating transmission of the one or more updated network parameter values to one or more network entities of the wireless network.

In another particular aspect, a system for predicting handover success rates and updating network parameter values using machine learning includes a memory and one or more processors communicatively coupled to the memory. The one or more processors are configured to receive, from one or more network entities of a wireless network, handover data associated with a plurality of cells of the wireless network. The handover data indicates handover success rates associated with the plurality of cells. The one or more processors are also configured to provide the handover data to a first set of machine learning (ML) models to group the plurality of cells into multiple clusters of cells. The first set of ML models are configured to cluster cells based at least in part on the handover success rates associated with the cells. The one or more processors are configured, for each of one or more clusters of the multiple clusters, to provide a portion of the handover data associated with cells of the cluster to a second set of ML models to predict future handover success rates for the cells of the cluster, and determine one or more updated network parameter values for the cells of the cluster based on the predicted future handover success rates. The second set of ML models are configured to predict future handover success rates based on handover data associated with the cells of the cluster. The one or more processors are further configured to initiate transmission of the one or more updated network parameter values to one or more network entities of the wireless network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Aspects of the present disclosure provide systems, methods, and computer-readable storage media for automatically predicting future handover success rates for cells of a wireless network based on current handover data for the cells, or cells having similar handover behaviors. The predicted future handover success rates may be used to determine updated network parameter values (e.g., updated handover parameter values) to be set at the cells to improve actual future handover success rates at the cells. Because handover success rates and/or handover failure rates may be one of the most important key performance indicators (KPIs) of user quality of experience (QoE) for a wireless network, improving the handover success rates may improve user QoE more than improving other handover metrics, such as handover attempts or traffic channel attempts. Using machine learning and artificial intelligence processes to group cells into clusters associated with similar handover behaviors and to predict future handover success rates at the cluster level may use less processing resources than predicting handover success rates at the individual cell level. Such reduction in processing resources may be particularly useful for predicting handover success rates of fifth generation (5G) wireless networks, which may include a substantial number of small cells, such as microcells, femtocells, picocells, etc. Additionally, using the machine learning and artificial intelligence processes may leverage historical handover data from cells to predict future handover success rates and select updated network parameter values automatically, with improved accuracy and with minimal human activity. At least some aspects of the present disclosure may be implemented in self-organizing networks (SONs) to provide intelligence to automatically and rapidly tune network parameters at cells of the SONs, which may reduce operating costs as compared to networks that are managed at least partially by humans.

Figure 1:
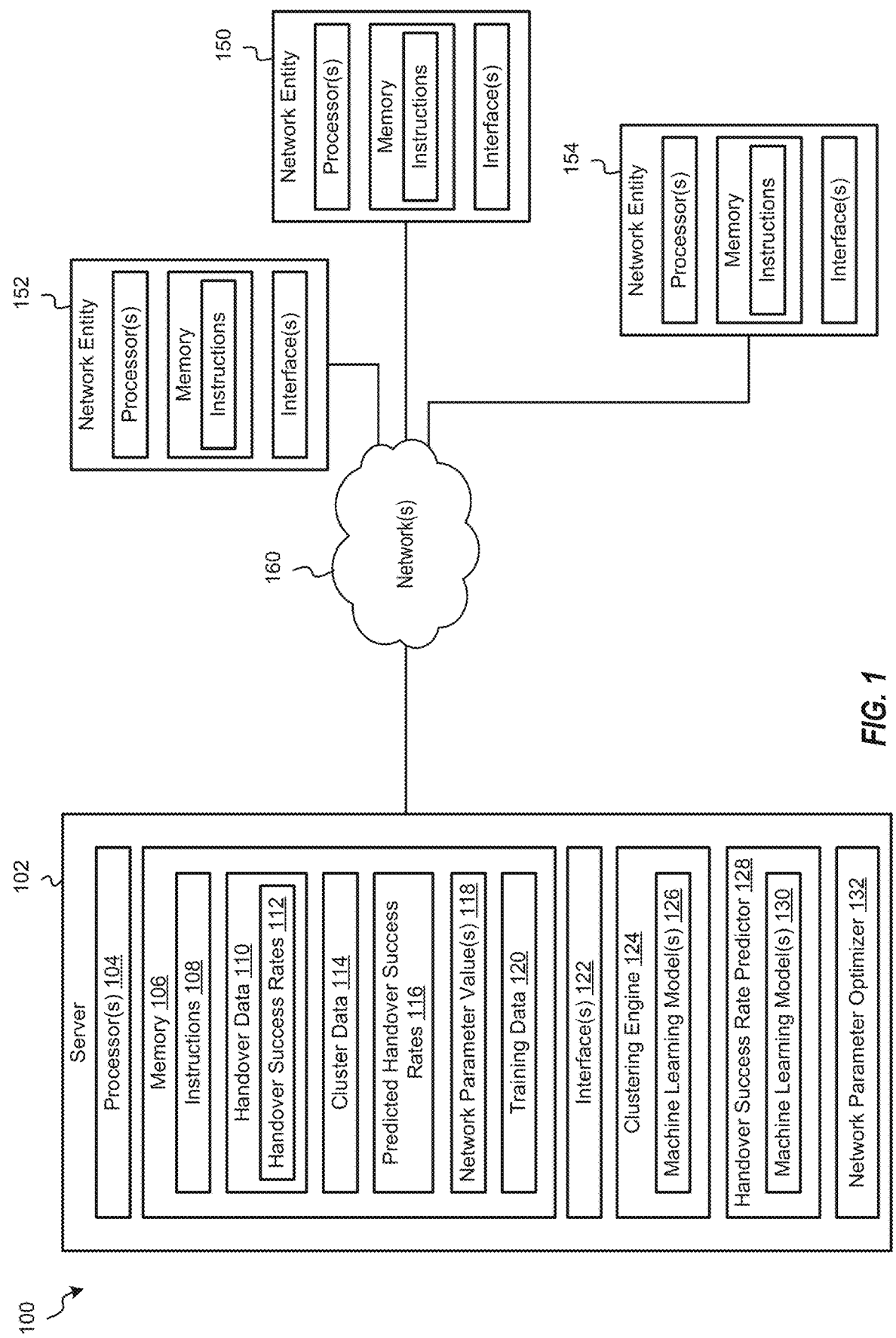
FIG. 1 is a block diagram of an example of a system for predicting handover success rates and updating network parameter values using machine learning according to aspects of the present disclosure.

Referring to FIG. 1, an example of a system for predicting handover success rates and updating network parameter values using machine learning according to aspects of the present disclosure is shown as a system 100. The system 100 may be configured to predict (e.g., forecast) future handover success rates for cells of a wireless network and to select updated network parameter values for configuring the cells to improve actual future handover success rates. The handovers described herein may include any type of handover, such as intra-frequency handovers, inter-frequency handovers, and inter-radio access technology (inter-RAT) handovers. The system 100 may be configured to operate with a wireless network that includes multiple cells, such as a 5G-compliant wireless network that includes many small cells (e.g., microcells, femtocells, picocells, etc.). As a particular non-limiting example, the wireless network may be a 5G ultra-dense network (UDN) (e.g., a wireless network that includes more cells than active users). As shown in FIG. 1, the system 100 includes a server 102, a first network entity 150, a second network entity 152, a third network entity 154, and one or more networks 160. Although three network entities 150-154 are illustrated in FIG. 1, in other implementations, the system 100 may include fewer than three network entities or more than three network entities.

The server 102 includes one or more processors 104, a memory 106, one or more communication interfaces 122, a clustering engine 124, a handover success rate predictor 128, and a network parameter optimizer 132. It is noted that functionalities described with reference to the server 102 are provided for purposes of illustration, rather than by way of limitation and that the exemplary functionalities described herein may be provided via other types of computing resource deployments. For example, in some implementations, computing resources and functionality described in connection with the server 102 may be provided in a distributed system using multiple servers or other computing devices, or in a cloud-based system using computing resources and functionality provided by a cloud-based system using computing resources and functionality provided by a cloud-based environment that is accessible over a network, such as the one of the one or more networks 160.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the server 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the server 102 may be stored in the memory 106 as instructions 108 that, when executed by the one or more processors 104, cause the one or more processors 104 to perform the operations described herein with respect to the server 102, as described in more detail below. Additionally, the memory 106 may be configured to store data, such as handover data 110, cluster data 114, predicted handover success rates 116, one or more network parameter values 118 (referred to herein as "the network parameter values 118"), and training data 120. Exemplary aspects of the handover data 110, the cluster data 114, the predicted handover success rates 116, the network parameter values 118, and the training data 120 are described in more detail below.

The one or more communication interfaces 122 may be configured to communicatively couple the server 102 to the one or more networks 160 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the server 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 102.

The clustering engine 124 may be configured to group a plurality of cells of the wireless network that includes network entities 150-154 into multiple clusters of cells based on handover success rates associated with the cells. This clustering may be agnostic to typical clustering parameters for cells, such as geographic location of the cells. To illustrate, the server 102 may be configured to receive the handover data 110 from one or more of the network entities 150-154. The handover data 110 may indicate handover success rates 112 associated with the cells of the wireless network. In some implementations, the handover data 110 also indicates numbers of handover attempts associated with the cells and numbers of traffic channel attempts associated with the cells. The handover data 110 and the handover success rates 112 may be measured for different time periods. For example, the handover data 110 may indicate measurements for each hour of a day, for each hour of a week, for each day of a week, for each day of a month, or for other time periods. The clustering engine 124 may be configured to determine the clusters based on similarity of the handover success rates 112 (and optionally numbers of handovers and/or numbers of traffic channel attempts) between cells for the same time periods. For example, a first cluster may correspond to cells having relatively low handover success rates between 6:00 am and 10:00 am, relatively high handover success rates between 10:00 am and 5:00 pm, relatively low handover success rates between 5:00 pm and 10:00 pm, and relatively median handover success rates between 10:00 pm and 6:00 am, as a non-limiting example. In addition to grouping cells based on similar time-dependent handover success rates, the clustering may also group cells based on similar handover success rate patterns caused by relative locations (not geographic locations). For example, cells that are near high speed rails or highways may typically have many handover attempts, which may result in lower handover success rates, and thus these cells may be grouped into the same cluster. In contrast, cells that cover buildings may have lower handover probability and higher handover success rates, even for large amounts of traffic, and thus these cells may be grouped into the same cluster. The clustering engine 124 may generate the cluster data 114 that indicates to which cluster each cell is assigned.

In some implementations, the clustering engine 124 may be configured to perform spectral clustering to group the cells into clusters based at least in part on the handover success rates 112 (e.g., optional in combination with the remainder of the handover data 110). In general, spectral clustering is a technique that identifies communities of nodes in a graph based on edges connecting the nodes. Spectral clustering typically uses information from eigenvalues of special matrices built from the graph or the data set. To illustrate, spectral clustering may be performed by constructing an undirected weighted graph based on the data (e.g., the handover data 110). Given $\{x_i\}_{i=1}^{n}$ with pairwise affinities $w_{ij}$, the unnormalized Laplacian $L=D-W$ (or the normalized graph Laplacian $L_S=1-D^{-1/2}WD^{-1/2}$) is obtained. Then, eigenvectors $\phi_1, \ldots, \phi_k$, corresponding to the first smallest k eigenvectors of L are computed, i.e., $L\phi_l=\phi_l$, where $\{\phi_l\}_{l=1}^{n}$ is an orthonormal basis in $\mathbb{R}_n$ and the eigenvalues are $\lambda_1 \leq \lambda_2 \leq \ldots \leq \lambda_n$. Stated differently, the original data is transformed from $\mathbb{R}^n$ to $\mathbb{R}^k$ through the eigenvectors of L. Spectral clustering also includes applying clustering to $\Phi$ to group the data into k clusters. There are several common ways to choose $w_{ij}$ (the weight of the edge between node $x_i$ and $x_j$). For example, the larger $w_{ij}$ represents more similarities or associations between $x_i$ and $x_j$. In some implementations, the clustering engine 124 may be configured to perform k-means clustering to cluster the cells based on the handover success rates 112 (and optionally the numbers of handover attempts indicated by the handover data 110, the number of traffic channel attempts indicated by the handover data 110, other information, or a combination thereof). Alternatively, the clustering engine 124 may be configured to perform other types of clustering, such as Gaussian mixture model (GMM) clustering, automatic relevance determination (ARD), nearest-neighbors clustering, and the like.

To perform the clustering of the cells, the clustering engine 124 may use first machine learning (ML) models 126, which may be included in or accessible to the clustering engine 124 (e.g., via storage at the memory 106). For example, the first ML models 126 may be configured to receive the handover data 110 and to generate the cluster data 114 that indicates grouping of the cells into clusters. In some implementations, the first ML models 126 may be trained to perform k-means clustering, or other unsupervised learning processes, based on the handover success rates 112 (and optionally the numbers of handover attempts, the numbers of traffic channel attempts, other information, or a combination thereof) for each of multiple cells to group the cells into clusters that share similar handover success rate patterns during the same time periods. The first ML models 126 may include a single ML model or multiple ML models configured to perform the clustering. In some implementations, the first ML models 126 may include or correspond to one or more neural networks (NNs). In other implementations, the first ML models 126 may include or correspond to other types of ML models or constructs, such as support vector machines (SVMs), decision trees, random forests, regression models, Bayesian networks (BNs), dynamic Bayesian networks (DBNs), Gaussian processes, hidden Markov models (HMMs), and the like. The server 102 may train the first ML models 126 to perform clustering, or the first ML models 126 may be pre-trained and received by the server 102 from another source.

In some implementations, the clustering engine 124 may be configured to periodically perform clustering based on received handover data. For example, the clustering engine 124 may be configured to perform clustering once an hour, once a day, or according to any other schedule. Periodically performing the clustering may result in different clusters as handover data for additional cells is received. Additionally or alternatively, the clustering engine 124 may be configured to cluster additional cells as handover data for the additional cells is received. For example, the clustering engine 124 may be configured to receive handover data associated with an additional cell after grouping multiple cells into clusters, and the clustering engine 124 may be configured to assign the additional cell into an already-established cluster, or a new cluster, based on the handover data associated with the additional cell.

The handover success rate predictor 128 may be configured to predict future handover success rates for cells of the clusters based on current handover success rates (and other current handover data) for the cells of the clusters. For example, the handover success rate predictor 128 may be configured to receive the handover data 110 (e.g., current handover data and current handover success rates) and to predict (e.g., forecast) the predicted handover success rates 116 based on the handover success rates 112, and optionally other information indicated by the handover data 110, such as numbers of handover attempts and numbers of traffic channel attempts. To predict the predicted handover success rates 116, the handover success rate predictor 128 may be configured to perform time-series forecasting based on the handover data 110. In some implementations, the handover success rate predictor 128 may be configured to perform time-series forecasting according to Equation 1 below, $$y_t = \text{activation function}(W^* X_t + R^* y_{t-1}) \quad \text{Equation 1}$$

where $y_{t-1}$ is the handover success rate in the current hour, $X_t$ is the input feature vector of the cell cluster (which contains the average number of handover attempts and the average number of traffic channel attempts of that cell cluster for which the handover success rate $y_t$ is to be predicted), and W and R are the weights for different layers in the time-series forecasting model. Historical handover success rates may also be an input for the time-series forecasting.

To predict the predicted handover success rates 116, the handover success rate predictor 128 may use second ML models 130, which may be included in or accessible to the handover success rate predictor 128 (e.g., via storage at the memory 106). For example, the second ML models 130 may be configured to receive the handover data 110 (including the handover success rates 112) and to predict the predicted handover success rates 116. The second ML models 130 may be configured to perform time-series forecasting based on handover success rates (and optionally the numbers of handover attempts, the numbers of traffic channel attempts, other information, or a combination thereof) for a cluster (e.g., for one or more cells included in the cluster) to predict the predicted handover success rates 116 for cells of the cluster. The second ML models 130 may include a single ML model or multiple ML models configured to perform the time-series forecasting. In some implementations, the second ML models 130 may include or correspond to one or more recurrent neural networks (RNNs), one or more long short-term memory (LSTM) networks, or a combination thereof. In other implementations, the second ML models 130 may include or correspond to other types of ML models or constructs, such as SVMs, decision trees, random forests, regression models, BNs, DBNs, Gaussian processes, HMMs, and the like.

To illustrate, RNNs are a class of neural networks that allow previous outputs to be used as inputs in addition to having hidden states. RNNs are used for deep learning processes because very large architectures may be successfully trained. A "chunk" (e.g., a layer, multiple layers, or some other portion) of a RNN looks at an input $x_t$ and outputs a value $h_t$. A loop allows information to be passed from one stage of the RNN to the next. An RNN may represent multiple copies of the same network, each passing a message to a successor copy. Because of this functionality, RNNs may be particularly suited for use with forecasting problems, which may add complexity of a sequence of dependence among the input variables.

LSTM networks can be a particular type or subset of RNNs which are configured to address two problems associated with RNNs: the long term dependency problem in RNNs, and the vanishing gradient/exploding gradient. Each "block" (e.g., stage, network, etc.) of a LSTM network may include three gates: a forget gate that is configured to decide what information to discard from the block, an input gate that is configured to decide which values from the input to use to update the memory state of the block, and an output gate configured to decide what to output based on the input and the memory of the block. As a first step, the forget gate (e.g., a sigmoid layer) may look at $h_{t-1}$ and $x_t$ and output a value between 0 and 1 for each number in the cell state (e.g., block state or memory state) $C_{t-1}$. A value of 1 may represent a decision to "completely keep this number" while a value of 0 may represent a decision to "completely discard this number." For example, the forget gate may perform the decision according to Equation 2 below.

$$f_t = \sigma(W_f^* [h_{t-1}, x_1] + b_f) \quad \text{Equation 2}$$

As a second step, the input gate may decide what new information is to be stored in the cell state. First, a sigmoid layer called the "input gate layer" decides which values to update. Next, a tan h layer creates a vector of new candidate values, $C\sim_t$, that may possibly be added to the cell state. The input gate layer may perform the decision according to Equation 3 below, and the tan h layer may perform the vector creation according to Equation 4 below. The outputs of the input gate layer and the tan h layer may be combined to create an update to the cell state.

$$i_t = \sigma(W_i^* [h_{t-1}, x_t] + b_i) \quad \text{Equation 3}$$

$$C\sim_t = \tan h(W_C^* [h_{t-1}, x_t] + b_C) \quad \text{Equation 4}$$

As a third step, the previous cell state $C_{t-1}$ may be updated into a new cell state $C_t$. For example, the previous cell state $C_{t-1}$ may be multiplied by $f_t$ (the forget gate function) to "forget" the values decided by the forget gate. Then the result is added to the new candidate values $C\sim_t$, which may be scaled based on the decision to update each state value. The output gate may decide the output values according to Equation 5 below.

$$C_t = f_t * C_{t-1} + i_t * \tilde{C}_t \quad \text{Equation 5}$$

In some implementations, the server 102 may be configured to train the second ML models 130 using training data prior to predicting the predicted handover success rates 116. The server 102 may train the second ML models 130 prior to providing the handover data 110 to the second ML models 130 for predicting the predicted handover success rates 116. For example, the server 102 may provide the training data 120 to the second ML models 130 to train the second ML models 130 to predict future handover success rates based on current handover success rates and handover data. The training data 120 may be based on historical handover success rates and historical handover data for cells of the clusters. For example, the training data 120 may include the historical handover success rates and historical handover data, or vectors of features extracted from the historical handover success rates and the historical handover data. In some implementations, the server 102 may receive the historical handover success rates and handover data from one or more of the network entities 150-154, and the training data 120 may be generated by the server 102. Alternatively, the server 102 may access a remote data source, such as a data base, that stores the training data 120 (or historical handover data used for generating the training data 120). In some implementations, each ML model (or set of ML models) of the second ML models 130 may be trained for predicting future handover success rates of cells within a respective cluster. For example, a first ML model (or a first set of ML models) of the second ML models 130 may be trained based on historical handover success rates and handover data for cells included in a first cluster to predict future handover success rates for cells included in the first cluster, and a second ML model (or a second set of ML models) of the second ML models 130 may be trained based on historical handover success rates and handover data for cells included in a second cluster to predict future handover success rates for cells included in the second cluster. In some other implementations, an entirety of the second ML models 130 may be trained to predict future handover success rates for all clusters. For example, the training data 120 may be labelled by cluster identifiers (IDs), such that the second ML models 130 are trained to predict different future handover success rates for cells associated with different cluster IDs. Thus, the second ML models 130 may be configured to leverage historical handover success rates to identify different handover success rate patterns for different clusters and to predict future handover success rates for cells on a cluster-by-cluster basis, which may require fewer processing resources than predicting future handover success rates for cells on a cell-by-cell basis.

The network parameter optimizer 132 may be configured to determine (e.g., select) the network parameter values 118 (e.g., updated network parameter values) based on the predicted handover success rates 116. For example, the network parameter optimizer 132 may be configured to select one or more network parameter values (e.g., one or more handover parameter values) for cell(s) included in a first cluster based on the predicted future handover success rates for the first cluster. The network parameter values 118 may include tuned values of network parameters to be set at respective cells to improve actual future handover success rates at the respective cells. For example, thresholds, margins, and other parameters may be tuned based on the predicted handover success rates 116 to increase the speed and accuracy of handover detection, and tuning these parameters at the respective cells may reduce handover and radio link failures (RLFs) experienced by mobile devices travelling throughout the cells. In some implementations, the network parameter values 118 may include one or more reference signal received power (RSRP) thresholds, one or more reference signal received quality (RSRQ) thresholds, one or more hysteresis margins, one or more time-to-trigger (TTT) thresholds, one or more averaging window parameter values, other network parameter values, or a combination thereof. As a non-limiting example, a RSRP threshold may be increased based on a relatively low predicted future handover success rate to improve the actual future handover success rate by reducing the number of handovers attempted for a neighboring cell associated with a low RSRP. Additional details of selecting the network parameter values 118 are described herein with reference to FIG. 2. Although the network parameter values 118 are described as including particular parameter values, such description is not limiting, and in other implementations the network parameter values 118 may include any type of handover-related network parameters, such as handover control parameters (HCPs), TTT parameters, handover margin (HOM) parameters, or a combination thereof, that are associated with 5G networks, 4G/LTE networks, 3G networks, or any other type of wireless communication network.

In some implementations, the network parameter optimizer 132 may be configured to determine the network parameter values 118 based on mappings of network parameters to future handover success rates. For example, the network parameter optimizer 132 may be configured to compare a predicted future handover success rate to one or more success rate thresholds, and based on the comparison, to select one or more particular network parameters for tuning to improve the predicted handover success rate based on a mapping of network parameters to handover success rates stored at the memory 106 or otherwise accessible to the server 102 (e.g., via a database or other external storage location). In some other implementations, the network parameter optimizer 132 may include or have access to ML models that are trained to output the network parameter values 118 based on the predicted handover success rates 116. For example, the second ML models 130, or additional ML models, may be trained using training data that is based on historical handover success rates, historical network parameter values, and the resultant handover success rates due to the historical network parameter values, to determine the network parameter values 118 based on the predicted handover success rates 116.

The network entities 150-154 may include or correspond to base stations (e.g., evolved node-Bs (eNBs), next generation node-Bs (gNBs), microcells, femtocells, picocells, etc.), parts of a core network (e.g., a mobile exchange and data network that manages mobile voice, data, and internet connections for a wireless network, such as a cellular network), servers (e.g., data servers, web servers, etc.), routers, relays, switches, or any parts thereof. Any of the network entities 150-154 include one or more processors, a memory, and one or more communication interfaces. The one or more processors may include one or more microcontrollers, ASICs, FPGAs, CPUs having one or more processing cores, or other circuitry and logic configured to facilitate the operations of the network entities 150-154 in accordance with aspects of the present disclosure. The memory may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the network entities 150-154 may be stored in the memory as instructions that, when executed by the one or more processors, cause the one or more processors to perform the operations described herein with respect to the network entities 150-154, as described in more detail below. The one or more communication interfaces may be configured to communicatively couple the network entities 150-154 to the one or more networks 160 via wired or wireless communication links established according to one or more communication protocols or standards (e.g., an Ethernet protocol, a TCP/IP, an IEEE 802.11 protocol, an IEEE 802.16 protocol, a 3G communication standard, a 4G/LTE communication standard, a 5G communication standard, and the like).

In some implementations, the network entities 150-154 are included in a wireless network, such as a cellular network. The wireless network may be a 5G-compliant wireless network. The 5G-compliant wireless network may include multiple small cells, such as microcells, femtocells, and picocells. Such small cells may support smaller coverage areas than base stations of other wireless networks, such as 4G/LTE-compliant wireless networks. Accordingly, the 5G-compliant wireless network may be associated with an increased number of handovers as user devices are handed over from one small cell to another small cell, as compared to 4G/LTE-compliant wireless networks. In some implementations, one or more of the network entities 150-154 may include or correspond to base stations (e.g., microcells, femtocells, picocells, etc.) of the 5G-compliant wireless network. Additionally or alternatively, one or more of the network entities 150-154 may include or correspond to a device that is configured to aggregate metrics and measurements from the base stations (e.g., from the cells), such as a device or component of a core network of the 5G-compliant wireless network or another device or component of the 5G-compliant wireless network. One or more of the network entities 150-154 may be configured to provide this data, such as the handover data 110, to the server 102.

During operation of the system 100, the server 102 may receive the handover data 110 from one or more of the network entities 150-154. The handover data 110 may indicate the handover success rates 112 associated with cells of the wireless network that includes the network entities 150-154, in addition to other metrics, such as numbers of handover attempts associated with the cells, numbers of traffic channel attempts associated with the cells, and the like. The clustering engine 124 may group the cells associated with the handover data 110 into one or more clusters based on the handover data 110. For example, the clustering engine 124 may provide the handover data 110 to the first ML models 126 to generate the cluster data 114 that indicates the grouping of the cells into the clusters. Cells grouped into each cluster may share similar handover patterns, and cells in different clusters may have different handover patterns. In some implementations, the clustering may be performed periodically. In some other implementations, the clustering may be performed "continuously" such that, as handover data associated with additional cells is received, the additional cells are grouped into an already established cluster or a new cluster based on the respective handover data.

The handover success rate predictor 128 may determine, for one or more cells of the clusters, the predicted handover success rates 116. For example, the handover success rate predictor 128 may perform time-series forecasting, based on the handover data 110 (or portions thereof associated with the one or more cells, or cells within the same clusters as the one or more cells), to predict the predicted handover success rates 116. In some implementations, the handover success rate predictor 128 may provide the handover data 110 to the second ML models 130, in addition to or routed based on the cluster data 114, and the second ML models 130 may generate the predicted handover success rates 116 based on the handover data 110, such as based on one or more of the handover success rates 112, the number of handover attempts, the number of traffic channel attempts, and other handover metrics.

The network parameter optimizer 132 may determine the network parameter values 118 based on the predicted handover success rates 116. For example, the network parameter optimizer 132 may select values of one or more network parameters (e.g., handover parameters) for a cell based on the predicted handover success rate associated with the cell to improve an actual future handover success rate for the cell. To illustrate, the network parameter values 118 may include increased or decreased thresholds that are associated with improving signal quality for handover targets or reducing "ping pong" handovers (e.g., rapid handovers between the same two or more cells). The server 102 may provide the network parameter values 118 to one or more of the network entities 150-154 for use in tuning parameters of the various cells (e.g., the various base stations) of the wireless network.

In some implementations, the clustering performed by the clustering engine 124, the prediction of the predicted handover success rates 116 by the handover success rate predictor 128, the determination of the network parameter values 118 by the network parameter optimizer 132, or a combination thereof, may be performed in real-time/substantially real-time (e.g., accounting for processing needs of the various aspects being utilized). In some other alternatives, at least the clustering may be performed at an earlier time, and the prediction of the predicted handover success rates 116 and the determination of the network parameter values 118 may be performed rapidly based on the cluster data 114 and the handover data 110 (e.g., current handover data for the cells).

As described above, the system 100 provides automated predicting of future handover success rates and determination of network parameter values for improving actual future handover rates for cells of a wireless network in real-time, such as by predicting the predicted handover success rates 116 using the handover success rate predictor 128 or determining the network parameter values 118 using the network parameter optimizer 132. Automating the process of determining the network parameter values 118 may substantially reduce (or eliminate) the activity of a human network operator in a network management process and reduce the number of handover failures or RLFs, thereby improving customer quality of experience (QoE) and customer satisfaction. By leveraging deep learning, such as by training and using the first ML models 126 and/or the second ML models 130 in the predicting and parameter value selection process, the system 100 may adapt to changing handover patterns at cells of the wireless network, which would otherwise require significant time and activity by a human network operator and may result in incorrect network parameter values. Determining the network parameter values 118 based on the predicted handover success rates 116 (or predicted handover failure rates) may improve customer QoE more than determining the network parameter values 118 based on other handover metrics, such as handover attempts or traffic channel attempts, particularly due to handover success rate (or handover failure rate) being a more important key performance indicator (KPI) of customer QoE than other handover metrics. Additionally, by grouping the cells into clusters and predicting the future handover success rates on a cluster-by-cluster basis, the system 100 may perform predicting and network parameter value selection using reduced processing resources as compared to performing the processes on a cell-by-cell basis. This reduction in processing resources may be particularly beneficial for operating on 5G-compliant wireless networks, which may include a significant number of small cells as compared to other types of wireless networks. Additionally, predicting the handover success rates and selecting the network parameter values based on handover data associated with the cells may be more efficient and use less resources than implementing techniques that use handover data, movement trajectories, and received signal strengths (RSSs) from user devices as input data. Additionally or alternatively, the system 100 may enable a change from a reactive approach for handover failures to a proactive approach for handover failures, which may prevent handover failures before they occur, thereby improving customer QoE.

In some implementations, the system 100 may be integrated in a self-organizing network (SON). A SON may include automation technology that is designed to make the planning, configuration, management, optimization, and healing of mobile radio access networks simpler and faster. Some SON functionality and behavior is specified in wireless communication recommendations or standards, such as those by the Third Generation Partnership Project (3GPP) or Next Generation Mobile Networks (NGMN). SON technology may reduce the lifecycle cost of running a mobile communication network by reducing or eliminating manual configuration of network elements at the time of deployment as well as providing dynamic optimization and troubleshooting during operation. SON functionalities are typically divided into three major groups: self-configuration functions, self-optimization functions, and self-healing functions. Self-configuration functions enable base stations to be automatically configured and integrated when being added to the network, including both connectivity establishment and download of configuration parameters. Additionally, when a new base station is added to the network, the new base station is automatically recognized and registered by the network, and neighboring base stations automatically adjust technical parameters, such as emission power, antenna tilt, and the like, in order to provide their configured coverage and capacity while avoiding interference with the new base station. Self-optimization functions may change the configuration of parameters at various base stations to improve one or more operating metrics based on measurements at the base stations and measurements received from mobile devices. As an illustrative example, a percentage of base stations may be automatically switched off during night hours to conserve power, and the remaining base stations may automatically reconfigure parameters in order to cover their respective coverage areas and the coverage areas of neighboring powered-down base stations. The powered-down base stations may rapidly "wake up" (e.g., be turned back on) in response to sudden growth in connectivity demand within the network. Self-healing functions may reduce the impact of degraded performance or failure of nodes in the network. For example, nodes of the network may continually monitor for failing nodes and may adjust parameters in adjacent cells when a node fails in order to support the users of the failed node. In at least some implementations, integration of the system 100 in a SON may enable or improve self-optimization functions of the SON, such as automatically and dynamically adjusting network parameters to improve future handover success rates at cells within the network.

Figure 2:
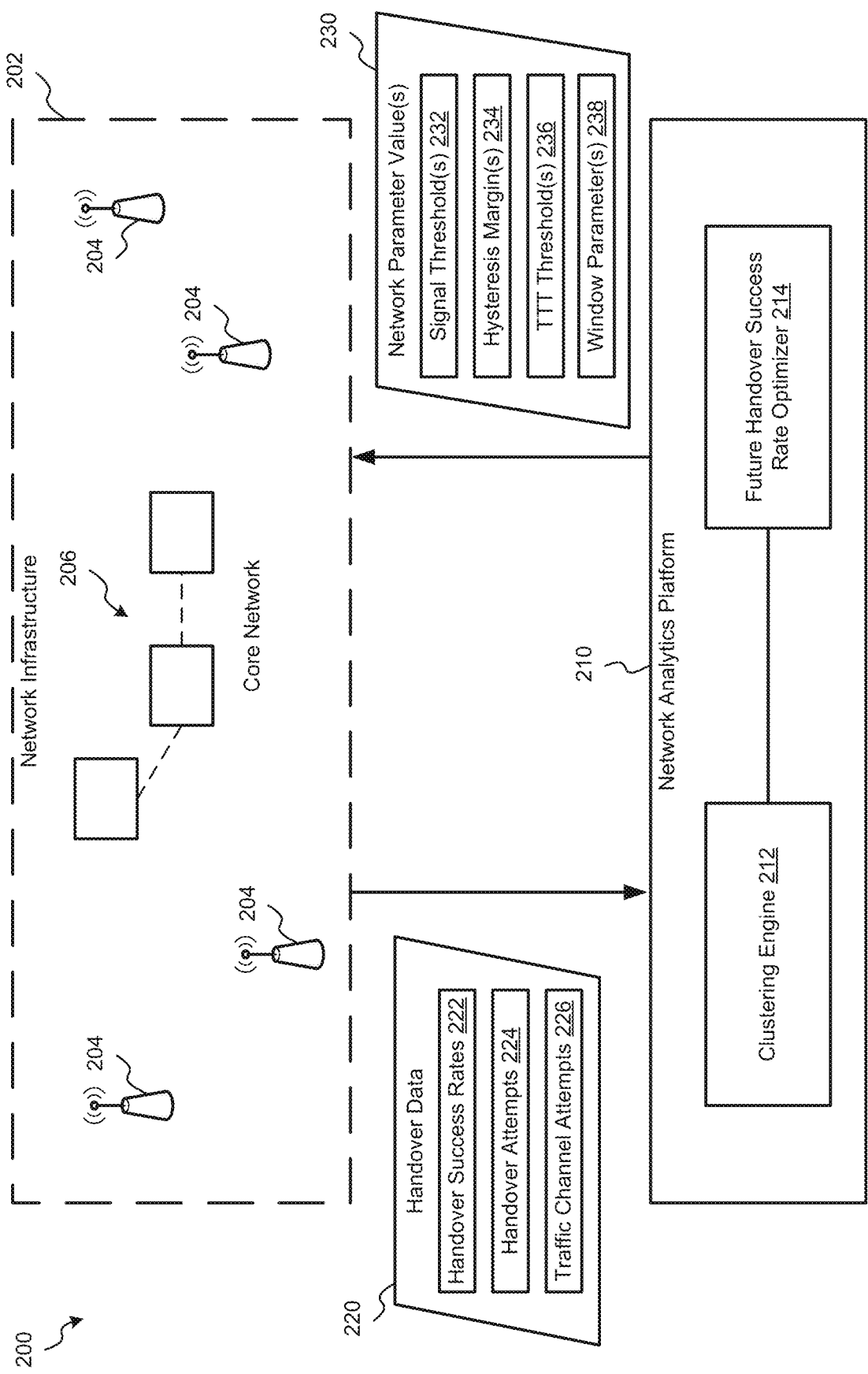
FIG. 2 is a block diagram of an example of a system for automated tuning of network parameters based on handover data according to aspects of the present disclosure.

Referring to FIG. 2, an example of a system for automated tuning of network parameters based on handover data according to aspects of the present disclosure is shown as a system 200. In some implementations, devices or components of the system 200 may include or correspond to devices or components of the system 100 of FIG. 1 (e.g., a system for predicting handover success rates and updating network parameter values using machine learning).

As shown in FIG. 2, the system 200 includes a network infrastructure 202 of a wireless network, such as a cellular network/radio access network, and a network analytics platform 210. As shown in FIG. 2, the network analytics platform 210 may be external to the network infrastructure 202, such as by being a cloud-based network analytics platform. Alternatively, the network analytics platform 210 may be included in device(s) or component(s) of the network infrastructure 202. In some implementations, the network analytics platform 210 may include or correspond to the server 102 of FIG. 1.

The network infrastructure 202 may include one or more base stations 204 dispersed throughout a geographic region of the network and a core network 206. The base stations 204 (e.g., eNBs, gNBs, etc.) may each be configured to provide coverage to user devices within a respective coverage range. In some implementations, at least some of the base stations 204 may include or correspond to small cells, such as microcells, femtocells, picocells, and the like. The core network 206 may include one or more devices or components configured to manage mobile voice, data, and internet connections for user devices connected to the base stations 204. For example, the core network 206 may be configured to register the user devices, to maintain location awareness for the user devices, to forward voice, data, or internet communication packets to the appropriate base station 204 for communication to the user devices, and to perform other maintenance and operative functions for the network infrastructure 202. In some implementations, the network infrastructure 202 may include or correspond to a 5G-compliant network. As such, the network infrastructure 202 may include a significant number of the base stations 204. As a particular, non-limiting example, the network infrastructure 202 may include or correspond to a 5G-compliant UDN. In some other implementations, the network infrastructure 202 may include or correspond to another type of network, such as a 4G/LTE-compliant network, a 3G-compliant network, or another type of wireless network.

The network analytics platform 210 may include components to enable the functionality of the network analytics platform 210 described below, such as one or more processors, one or more memories, one or more communication interfaces, and the like. As shown in FIG. 2, the network analytics platform 210 includes a clustering engine 212 and a future handover success rate optimizer 214. The network analytics platform 210 may be configured to group cells (e.g., the base stations 204) of the network infrastructure 202 based on handover data associated with the cells. The future handover success rate optimizer 214 may be configured to predict future handover success rates for the cells on a cluster-by-cluster basis based on current handover data from the network infrastructure 202. Additionally, the future handover success rate optimizer 214 may be configured to determine network parameter values associated with the cells based on the predicted future handover success rates for the cells. In some implementations, the clustering engine 212 may include or correspond to the clustering engine 124 of FIG. 1, and the future handover success rate optimizer 214 may include or correspond to the handover success rate predictor 128 and the network parameter optimizer 132 of FIG. 1.

During operation of the system 200, the network analytics platform 210 may receive handover data 220 from the network infrastructure 202. The handover data 220 may be associated with the base stations 204 (e.g., with the cells of the network). The handover data 220 may indicate handover-related metrics, such as handover success rates 222 and optionally, numbers of handover attempts 224 and numbers of traffic channel attempts 226. In some implementations, each of the handover success rates 222, the numbers of handover attempts 224, and the numbers of traffic channel attempts 226 may include values that correspond to different time periods. For example, the network infrastructure 202 may provide average values for every hour of a day, average values for every hour of a week, average values for every day of a week, average values for every day of a month, or for some other time periods.

The clustering engine 212 may group the cells (e.g., the base stations 204) into clusters based on the handover data 220. For example, the clustering engine 212 may group the cells into different clusters having different handover success rate patterns based on the handover success rates 222. As another example, the clustering engine 212 may group the cells into different clusters having different handover-related patterns based on the handover success rates 222, the numbers of handover attempts 224, and the number of traffic channel attempts 226. The clustering may be performed using k-means clustering, nearest-neighbors clustering, GMM clustering, ARD, or another type of clustering process or algorithm. In some implementations, the clustering engine 212 may provide the handover data 220 to one or more ML models (e.g., the first ML models 126 of FIG. 1) that are configured to group cells into clusters based on handover success rates, and optionally other handover data (e.g., handover attempts, traffic channel attempts, etc.).

The future handover success rate optimizer 214 may predict future handover success rates for the cells, on a cluster-by-cluster basis, based on the handover data 220. For example, the future handover success rate optimizer 214 may perform time-series forecasting based on the handover success rates 222 (and optionally the numbers of handover attempts 224 and the numbers of traffic channel attempts 226) associated with cells of a cluster to predict future handover success values for cells of the cluster. Predicted future handover success rates may be different for cells of different clusters. Additionally, the future handover success rate optimizer 214 may determine one or more network parameter values 230 (e.g., updated network parameter values) based on the predicted future handover success rates. The future handover success rate optimizer 214 may determine the network parameter values 230 based on a mapping of network parameters to handover success rates or using artificial intelligence and machine learning processes. In some implementations, the future handover success rate optimizer 214 may provide the handover data 220 to one or more ML models (e.g., the second ML models 130 of FIG. 1) that are configured to predict future handover success rates and/or to determine network parameter values based on current handover data for cells of the clusters. In some such implementations, the one or more ML models may include or correspond to one or more RNNs, one or more LSTM networks, or a combination thereof.

The network parameter values 230 may include values of one or more handover parameters that are selected to improve actual handover success rates of the cells (e.g., the base stations 204). For example, the network parameter values 230 may include one or more signal thresholds 232, one or more hysteresis margins 234, one or more TTT thresholds 236, one or more averaging window parameter values 238, or a combination thereof, as non-limiting examples. The signal thresholds 232 may include RSRP thresholds that are used by the cells in identifying candidate cells for handover or reselection. For example, if a RSRP associated with a neighboring cell satisfies a RSRP threshold, the neighboring cell may be identified as a candidate cell for a handover. Additionally or alternatively, the signal thresholds 232 may include RSRQ thresholds that are used by the cells in identifying candidate cells for handover or reselection. For example, if a RSRQ associated with a neighboring cell satisfies a RSRQ threshold, the neighboring cell may be identified as a candidate cell for a handover. Thus, increasing RSRP or RSRQ thresholds may increase handover success rates by requiring candidate cells for handovers to be associated with strong signals, although this may increase time of identifying candidate cells. Alternatively, decreasing these thresholds may decrease the probability of a late handover while increasing the ping-pong effect. In some implementations, RSRQ may be used to identify (or rank) candidate cells if RSRP measurements do not provide sufficient information for reliable handover decisions. RSRQ is defined as RSRQ=(N*RSRP)/RSSI, where RSSI is defined as the total wideband power observed by a user device from all sources (e.g., including co-channel serving and non-serving cells, adjacent channel interference, and thermal noise within the measurement bandwidth), and N is the number of resource blocks (RBs) of the carrier RSSI measurement. Thus, RSRP may represent a desired signal strength, while RSRQ may additionally take into account interference levels in an efficient way.

The hysteresis margins 234, also referred to as handover margins, may be the main parameter that governs handovers between two cells (e.g., two base stations). The handover may be initiated if the link quality of another cell is better than the current link quality by a hysteresis value. Increasing the hysteresis margins 234 may reduce the ping-pong effect while also increasing handover failures by reducing the likelihood of identifying a candidate cell. The TTT thresholds 236 are used for controlling initiation of handovers. To illustrate, a handover is initiated if triggering requirements are fulfilled for a time interval that satisfies a TTT threshold. Increasing the TTT thresholds 236 may decrease the number of unnecessary handovers and the ping-pong effect while also delaying initiation of the handover, which may increase the probability of a handover failure. The averaging window parameter values 238 may be used to control length and shape of averaging windows used to filter out channel variation due to fading before a handover decision is made. Long averaging windows may reduce the number of handovers but may increase the delay. The shape of averaging windows, such as rectangular, exponential, etc., may affect the number of handovers and the probability of unnecessary handovers and the ping-pong effect.

After determination of the network parameter values 230, the network analytics platform 210 may provide the network parameter values 230 to the network infrastructure 202. Network parameters at the base stations 204 (e.g., for the cells) may be tuned based on the network parameter values 230. For example, a signal threshold at a first base station 204 may be tuned based on an increased value indicated by the signal thresholds 232 and associated with the first base station 204. Such network parameters at the base stations 204 may be tuned automatically to increase future handover success rates associated with the base stations 204 (e.g., with the cells) without requiring manual activity of a network operator.

Figure 3:
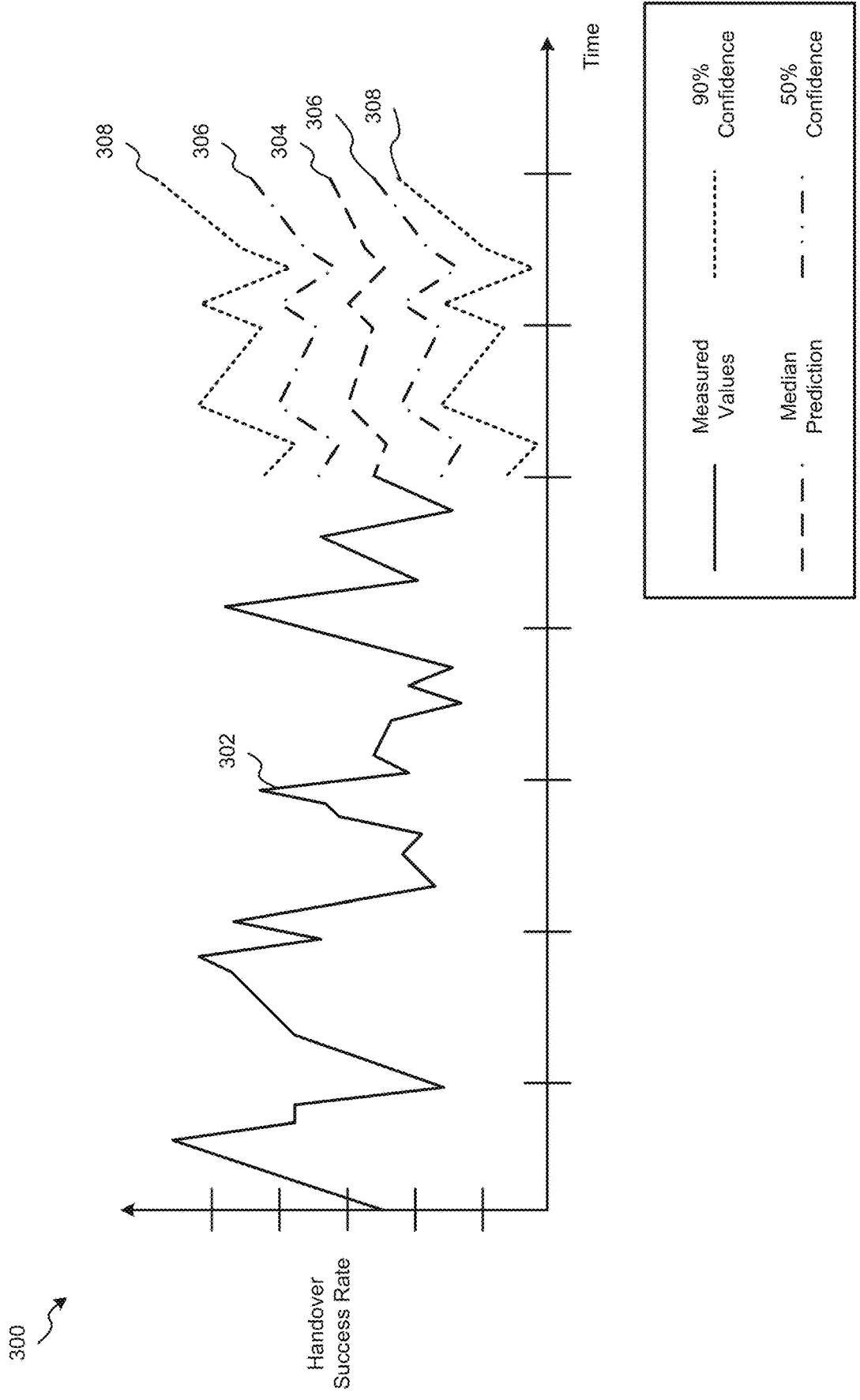
FIG. 3 is a graph of example handover success rates and predicted future handover success rates according to aspects of the present disclosure.

Referring to FIG. 3, a graph 300 of example handover success rates and predicted future handover success rates according to aspects of the present disclosure is shown. In some implementations, the handover success rates and the predicted future handover success rates of the graph 300 may include or correspond to handover data received by, and predicted future handover success rates predicted by, the server 102 of FIG. 1 or the network analytics platform 210 of FIG. 2.

As shown in FIG. 3, the graph 300 includes handover success rates 302. In some implementations, the handover success rates 302 may include or correspond to the handover success rates 112 of FIG. 1 or the handover success rates 222 of FIG. 2. As shown in FIG. 3, the handover success rates 302 may vary over time, such as due to changing user activity, changing load on the cell, changing signal conditions, other conditions, or a combination thereof. The handover success rates 302 may be measured for one or more time periods, such as hours, days, weeks, or other durations of time. The graph 300 also includes predicted future handover success rates. The predicted future handover success rates may include or correspond to the predicted handover success rates 116 of FIG. 1 or predicted future handover success rates predicted by the future handover success rate optimizer 214 of FIG. 2. The future handover success rates may be determined by ML models that leverage historical handover data for clusters of cells to predict future handover success rates on a cluster-by-cluster basis, as described with reference to FIGS. 1-2. In some implementations, the predicted future handover success rates may include multiple predicted values, such as median predicted handover success rates 304, bounds 306 (e.g., an upper bound and a lower bound) for predicted handover success rates associated with at least 50% confidence, and bound 308 for predicted handover success rates associated with at least 90% confidence. The predicted future handover success rates may be used to determine network parameter values to improve the actual future handover success rates, as described with reference to FIGS. 1-2.

Figure 4:
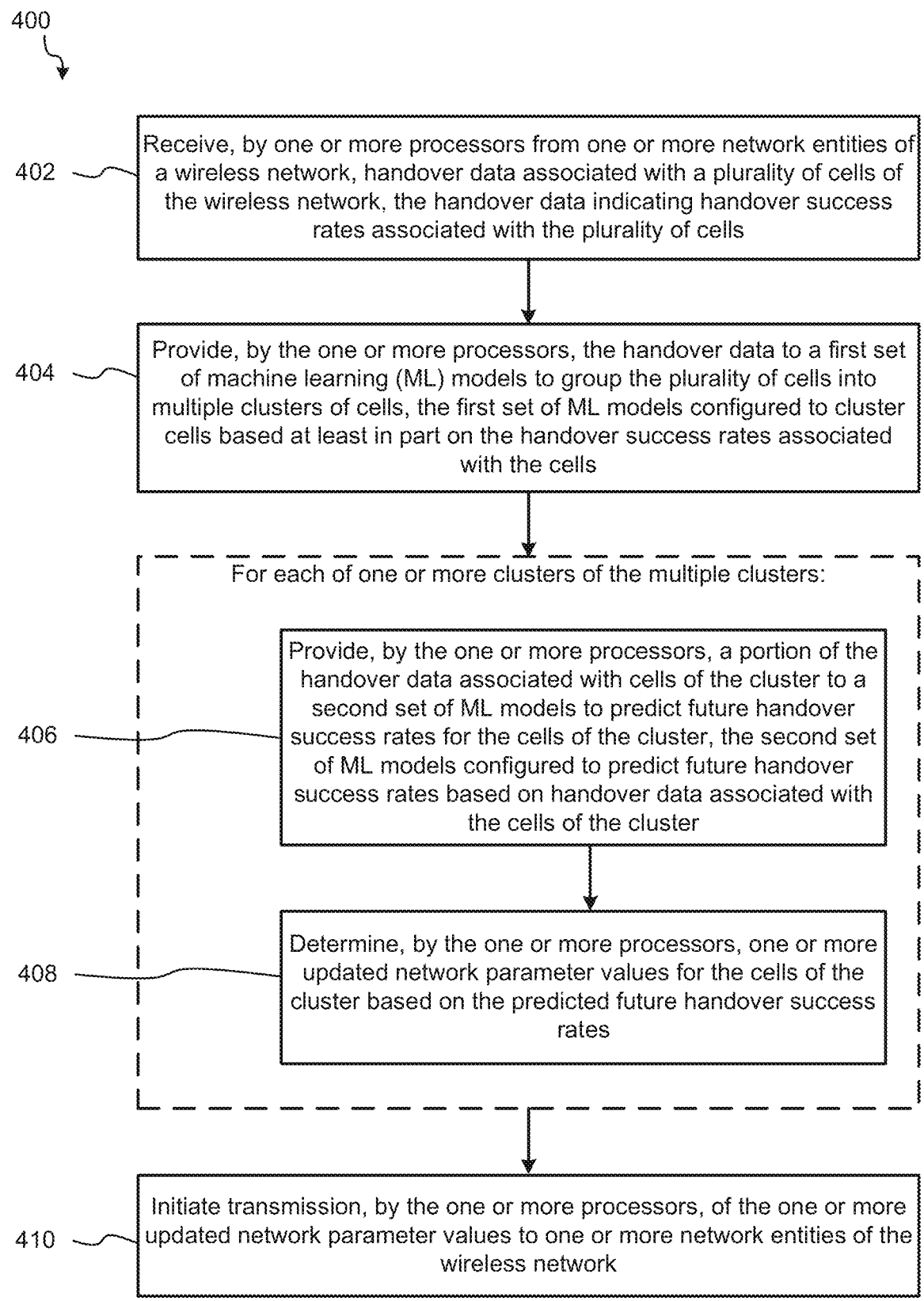
FIG. 4 is a flow diagram illustrating an example of a method for predicting handover success rates and updating network parameter values using machine learning according to aspects of the present disclosure.

Referring to FIG. 4, a flow diagram of an example of a method for predicting handover success rates and updating network parameter values using machine learning according to aspects of the present disclosure is shown as a method 400. In some implementations, the operations of the method 400 may be stored as instructions that, when executed by one or more processors (e.g., the one or more processors of a computing device of server or other component of a wireless network, such as a 5G-compliant network), cause the one or more processors to perform the operations of the method 400. In some implementations, the method 400 may be performed by a computing device, such as the server 102 of FIG. 1 (e.g., a computer device configured for improving handover success rates of cells of a wireless network) or the network analytics platform 210 of FIG. 2.

The method 400 includes receiving, by one or more processors from one or more network entities of a wireless network, handover data associated with a plurality of cells of the wireless network, at 402. The handover data indicates handover success rates associated with the plurality of cells. For example, the handover data may include or correspond to the handover data 110 that indicates the handover success rates 112 of FIG. 1, and the one or more network entities may include or correspond to one or more of the network entities 150-154 of FIG. 1. In some implementations, the wireless network may be a 5G-compliant UDN. The method 400 also includes providing, by the one or more processors, the handover data to a first set of ML models to group the plurality of cells into multiple clusters of cells, at 404. The first set of ML models are configured to cluster cells based at least in part on the handover success rates associated with the cells. For example, the first set of ML models may include the first ML models 126 that are configured to generate the cluster data 114 of FIG. 1.

The method 400 includes, for each of one or more clusters of the plurality of clusters, providing, by the one or more processors, a portion of the handover data associated with cells of the cluster to a second set of ML models to predict future handover success rates for the cells of the cluster, at 406. The second set of ML models are configured to predict future handover success rates based on handover data associated with the cells of the cluster. For example, the second set of ML models may include the second ML models 130 that are configured to predict the predicted handover success rates 116 of FIG. 1. The method 400 also includes, for each of the one or more clusters of the plurality of clusters, determining, by the one or more processors, one or more updated network parameter values for the cells of the cluster based on the predicted future handover success rates, at 408. For example, the one or more updated network parameter values may include or correspond to the network parameter values 118 of FIG. 1. The method 400 further includes initiating transmission, by the one or more processors, of the one or more updated network parameter values to one or more network entities of the wireless network, at 410. For example, the server 102 may transmit the network parameter values 118 to one or more of the network entities 150-154.

In some implementations, the handover data may further indicate numbers of handover attempts associated with the plurality of cells and numbers of traffic channel attempts associated with the plurality of cells. For example, the handover data may indicate the handover attempts 224 and the traffic channel attempts 226 of FIG. 2. In some such implementations, the first set of ML models may be configured to cluster cells based further on the numbers of handover attempts and the numbers of traffic channel attempts. For example, the first ML models 126 of FIG. 1 (or the clustering engine 212 of FIG. 2) may be configured to cluster cells based further on the handover attempts 224 and the traffic channel attempts 226. Additionally or alternatively, the handover success rates, the number of handover attempts, the number of traffic channel attempts, or a combination thereof, are measured for different time periods. For example, the handover success rates, the number of handover attempts, and/or the number of traffic channel attempts may be measured every hour for a day, every hour for seven days, every day for a month, or for some other time periods.

In some implementations, the first set of ML models may be configured to perform k-means clustering to cluster cells based at least in part on the handover success rates associated with the cells. For example, the clustering engine 124 may use the first ML models 126 to perform k-means clustering of cells based on the handover success rates 112 of FIG. 1. Additionally or alternatively, the first set of ML models may include one or more NNs. For example, the first ML models 126 of FIG. 1 may include a single NN or multiple NNs. Alternatively, the first ML models 126 of FIG. 1 may include or correspond to one or more other types of ML models, such as SVMs, decision trees, random forests, regression models, BNs, DBNs, Gaussian processes, HMMs, and the like.

In some implementations, the second set of ML models comprises one or more LTSM networks, one or more RNNs, or a combination thereof. For example, the second ML models 130 of FIG. 1 may include or correspond to one or more LTSM networks, one or more RNNs, or a combination thereof. Alternatively, the second ML models 130 of FIG. 1 may include or correspond to one or more other types of ML models, such as SVMs, decision trees, random forests, regression models, BNs, DBNs, Gaussian processes, HMMs, and the like. Additionally or alternatively, the second set of ML models may be configured to perform time-series forecasting to predict future handover success rates based on handover data associated with the cells of the cluster. For example, the handover success rate predictor 128 may use the second ML models 130 to perform time-series forecasting to predict the predicted handover success rates 116 of FIG. 1.

In some implementations, the method 400 also includes training the second set of ML models using training data that is based on historical handoff data associated with multiple cells of the wireless network. At least some of the multiple cells are associated with different handover patterns than others of the multiple cells. For example, the server 102 may train the second ML models 130 using the training data 120 that is based on historical handover data from one or more of the network entities 150-154 of FIG. 1.

In some implementations, the one or more network updated parameter values may include one or more RSRP thresholds, one or more RSRQ thresholds, one or more hysteresis margins, one or more TTT thresholds, one or more averaging window parameter values, or a combination thereof. For example, the network parameter values 230 of FIG. 2 may include the signal thresholds 232 (e.g., RSRP and/or RSRQ thresholds), the hysteresis margins 234, the TTT thresholds 236, and the averaging window parameter values 238. Additionally or alternatively, the one or more updated network parameter values may be selected to improve the predicted future handover success rates. For example, the network parameter optimizer 132 of FIG. 1 may select the network parameter values 118 to improve future handover success rates of one or more cells for which network parameters are adjusted based on the network parameter values 118. Additionally or alternatively, the predicted future handover success rates and the one or more updated network parameter values may be determined in real-time. For example, the handover success rate predictor 128 and the network parameter optimizer 132 of FIG. 1 may operate to determine the predicted handover success rates 116 and the network parameter values 118, respectively, in real-time.

It is noted that other types of devices and functionality may be provided according to aspects of the present disclosure and discussion of specific devices and functionality herein have been provided for purposes of illustration, rather than by way of limitation. It is also noted that the method 400 may also include other functionality or operations consistent with the description of the operations of the system 100 of FIG. 1 and/or the system 200 of FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-4) may comprise processors, electronics devices, hardware devices, electronics components, logical circuits, memories, software codes, firmware codes, etc., or any combination thereof. In addition, features discussed herein relating to FIGS. 1-4 may be implemented via specialized processor circuitry, via executable instructions, and/or combinations thereof.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any implementation of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described.

Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIGS. 1-6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for predicting handover success rates and updating network parameter values using machine learning, the method comprising:
receiving, by one or more processors from one or more network entities of a wireless network, handover data associated with a plurality of cells of the wireless network,
the handover data indicating handover success rates associated with the plurality of cells;
providing, by the one or more processors, the handover data to a first set of machine learning (ML) models to group the plurality of cells into multiple clusters of cells,
the first set of ML models configured to cluster cells based at least in part on the handover success rates associated with the cells;
for each of one or more clusters of the multiple clusters:
providing, by the one or more processors, a portion of the handover data associated with cells of the cluster to a second set of ML models to predict future handover success rates for the cells of the cluster,
the second set of ML models configured to predict cluster-specific future handover success rates based on handover data associated with the cells of the cluster; and
determining, by the one or more processors, one or more updated network parameter values for the cells of the cluster based on the predicted cluster-specific future handover success rates; and
initiating transmission, by the one or more processors, of the one or more updated network parameter values to one or more network entities of the wireless network.

2. The method of claim 1, wherein the handover data further indicates numbers of handover attempts associated with the plurality of cells and numbers of traffic channel attempts associated with the plurality of cells.

3. The method of claim 2, wherein the first set of ML models are configured to cluster cells based further on the numbers of handover attempts and the numbers of traffic channel attempts.

4. The method of claim 2, wherein the handover success rates, the number of handover attempts, the number of traffic channel attempts, or a combination thereof, are measured for different time periods.

5. The method of claim 1, wherein the first set of ML models are configured to perform k-means clustering to cluster cells based at least in part on the handover success rates associated with the cells.

6. The method of claim 1, wherein the first set of ML models comprise one or more neural networks (NNs).

7. The method of claim 1, wherein the second set of ML models comprise one or more long short-term memory (LTSM) networks.

8. The method of claim 1, wherein the second set of ML models are configured to perform time-series forecasting to predict cluster-specific future handover success rates based on handover data associated with the cells of the cluster.

9. The method of claim 1, further comprising:
training the second set of ML models using training data that is based on historical handoff data associated with multiple cells of the wireless network,
wherein at least some of the multiple cells are associated with different handover patterns than others of the multiple cells.

10. The method of claim 1, wherein the one or more updated network parameter values comprise one or more reference signal received power (RSRP) thresholds, one or more reference signal received quality (RSRQ) thresholds, one or more hysteresis margins, one or more averaging window parameter values, or a combination thereof.

11. The method of claim 1, wherein the one or more updated network parameter values are selected to improve the predicted future handover success rates.

12. The method of claim 1, wherein the predicted future handover success rates and the one or more updated network parameter values are determined in real-time.

13. A non-transitory computer-readable storage medium storing instructions that, when executed by one or more processors, cause the one or more processors to perform operations for predicting handover success rates and updating network parameter values using machine learning, the operations comprising:
receiving, from one or more network entities of a wireless network, handover data associated with a plurality of cells of the wireless network,
the handover data indicating handover success rates associated with the plurality of cells;
providing the handover data to a first set of machine learning (ML) models to group the plurality of cells into multiple clusters of cells,
the first set of ML models configured to cluster cells based at least in part on the handover success rates associated with the cells;
for each of one or more clusters of the multiple clusters:
providing a portion of the handover data associated with cells of the cluster to a second set of ML models to predict future handover success rates for the cells of the cluster,
the second set of ML models configured to predict cluster-specific future handover success rates based on handover data associated with the cells of the cluster; and
determining one or more updated network parameter values for the cells of the cluster based on the predicted cluster-specific future handover success rates; and
initiating transmission of the one or more updated network parameter values to one or more network entities of the wireless network.

14. The non-transitory computer-readable storage medium of claim 13, wherein:
the handover data further indicates numbers of handover attempts associated with the plurality of cells and numbers of traffic channel attempts associated with the plurality of cells, and
the first set of ML models are configured to cluster cells based further on the numbers of handover attempts and the numbers of traffic channel attempts.

15. The non-transitory computer-readable storage medium of claim 13, wherein the operations further comprise:
training the second set of ML models using training data that is based on historical handoff data associated with multiple cells of the wireless network
wherein at least some of the multiple cells are associated with different handover patterns than others of the multiple cells.

16. The non-transitory computer-readable storage medium of claim 13, wherein:
the one or more updated network parameter values are selected to improve the predicted future handover success rates, and the one or more updated network parameter values comprise one or more reference signal received power (RSRP) thresholds, one or more reference signal received quality (RSRQ) thresholds, one or more hysteresis margins, one or more time-to-trigger (TTT) thresholds, one or more averaging window parameter values, or a combination thereof.

17. A system for predicting handover success rates and updating network parameter values using machine learning, the system comprising:
- a memory; and
- one or more processors communicatively coupled to the memory, the one or more processors configured to:
  - receive, from one or more network entities of a wireless network, handover data associated with a plurality of cells of the wireless network,
    - the handover data indicating handover success rates associated with the plurality of cells;
  - provide the handover data to a first set of machine learning (ML) models to group the plurality of cells into multiple clusters of cells,
    - the first set of ML models configured to cluster cells based at least in part on the handover success rates associated with the cells;
  - for each of one or more clusters of the multiple clusters:
    - provide a portion of the handover data associated with cells of the cluster to a second set of ML models to predict future handover success rates for the cells of the cluster,
      - the second set of ML models configured to predict cluster-specific future handover success rates based on handover data associated with the cells of the cluster; and
    - determine one or more updated network parameter values for the cells of the cluster based on the predicted cluster-specific future handover success rates; and
  - initiate transmission of the one or more updated network parameter values to one or more network entities of the wireless network.

18. The system of claim 17, wherein the first set of ML models comprise one or more neural networks (NNs) configured to perform k-means clustering to cluster cells based at least in part on the handover success rates associated with the cells.

19. The system of claim 17, wherein the second set of ML models comprise one or more long short-term memory (LTSM) networks, one or more recurrent neural networks (RNNs), or a combination thereof, configured to perform time-series forecasting to predict cluster-specific future handover success rates based on handover data associated with the cells of the cluster.

20. The system of claim 17, wherein the wireless network comprises a fifth generation (5G) ultra-dense network (UDN).

* * * * *